Patented Mar. 15, 1949

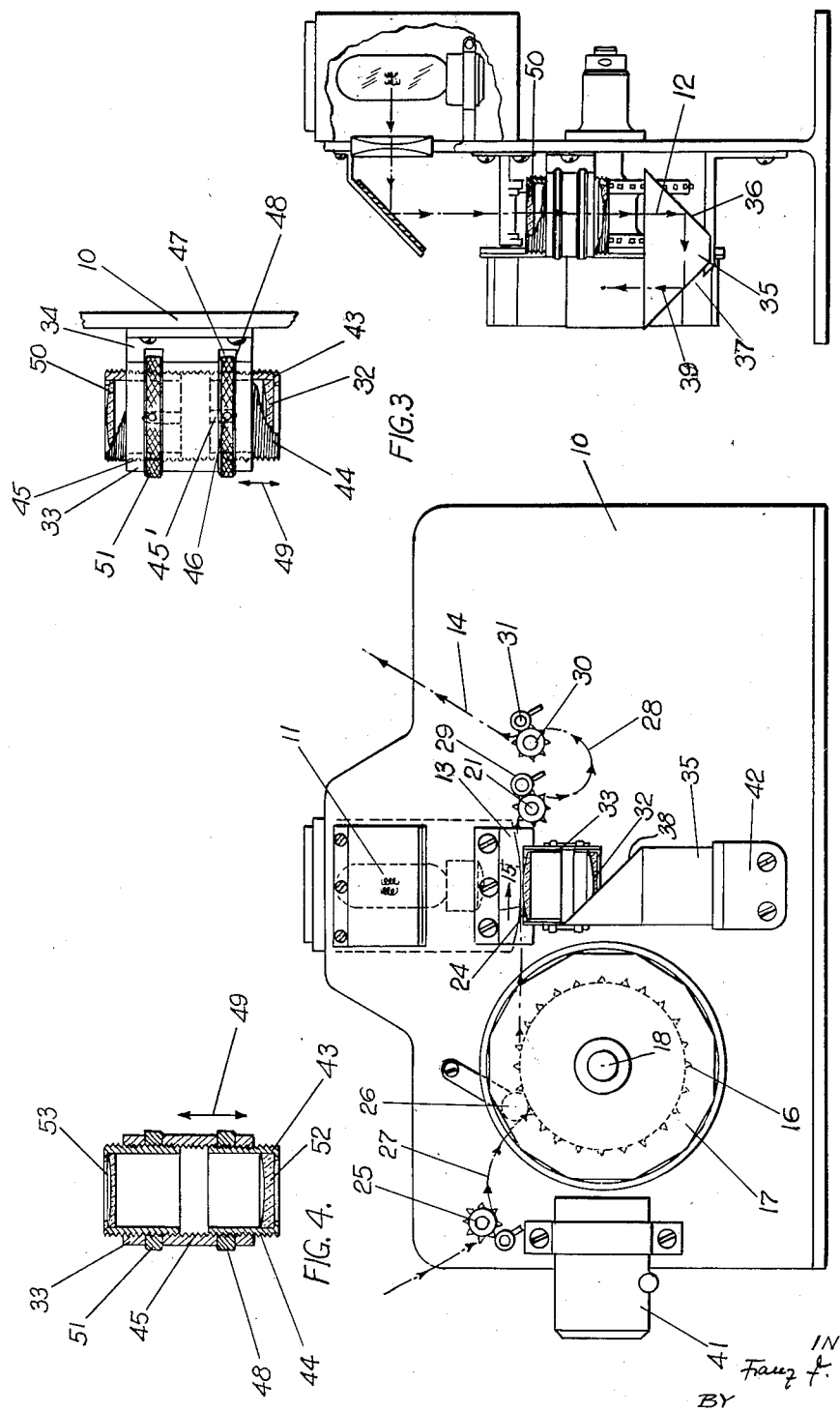

2,464,384

UNITED STATES PATENT OFFICE 2,464,384

SHRINKAGE COMPENSATING ROTATABLE PRISM CINEMATOGRAPHIC PROJECTOR

Franz F. Ehrenhaft, Forest Hills, N. Y.

Application April 1, 1946, Serial No. 658,698

11 Claims. (Cl. 88—16.8)

My present invention relates to continuous motion picture projectors and more particularly to motion picture projectors used for television purposes. Still more particularly, this invention relates to means for compensating for shrinkage of the films used for such projectors.

It is an object of my present invention to provide a continuous motion picture projector constructed in such a manner as to obtain steady images on the projection screen.

It is another object of my present invention to avoid formation of loops between the film transporting means and the refraction prism used as rectifier.

With the above objects in view, my new cinematographic projector includes as main elements a light source emitting a light beam, means for moving a film provided with a series of consecutive film frames with uniform speed through the path of this light beam, a rotatable rectifying member arranged in the path of the above mentioned light beam and having a size which is smaller than the size of a rotatable rectifying member corresponding to the size of the film frames on the projected film, and optical reducing means arranged in the path of the light beam between the film and the rotatable rectifying member mentioned above.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a front view of a cinematographic projector according to my present invention;

Fig. 2 is a side view of the projector shown in Fig. 1, partly in section;

Fig. 3 is a side view of the lens arrangement forming part of the projector shown in Figs. 1 and 2; and Fig. 4 shows a modified lens arrangement according to my present invention.

The cinematographic projector shown in Figs. 1 and 2 comprises a supporting wall 10 on which all parts of the projector are mounted. The main parts of this projector are the light source 11 mounted on wall 10, as shown, and emitting a light beam 12 passing through the film gate 13 arranged in the path of this light beam. This film gate 13 serves for guiding the film 14 passing through the film gate in direction of arrow 15, as indicated in Fig. 1.

The prism rotating sprocket 16 is arranged in the plane of movement of the film 14, as clearly shown in the drawings, particularly in Fig. 2. The compensating prism 17 is arranged co-axially with the sprocket 16. Both sprocket 16 and prism 17 are carried by shaft 18 freely rotatably about a rotating axis arranged normal to the plane of movement of film 14. As shown in the drawings, sprocket 16 is arranged immediately adjacent and as near as possible to edge 19 of film gate 13.

Immediately adjacent and as near as possible to the other edge 20 of film gate 13 the film transporting sprocket 21 is arranged; this sprocket 21 is arranged on the shaft 23 and driven in well-known manner by means of an electric motor and motion transmitting means, not shown in the drawing.

As shown in the drawings, particularly Fig. 1 thereof, the film guiding face 24 of film gate 13 is arranged substantially in the plane of film 14 during passage of the same from the prism rotating sprocket 16 to the film transporting sprocket 21.

It should be noted that the film is unwound from a reel not shown in the drawing by means of the driven sprocket 25, forms between this sprocket 25 and the guiding roller 26 a film loop 27, is then guided by this guiding roller 26 into contact with the prism rotating sprocket 16, is then pulled by means of the film transporting sprocket 21 past the film guiding face 24 of film gate 13, forms again a loop 28 between the guiding roller 29 holding the film in contact with sprocket 21 and another driven sprocket 30 cooperating with the guiding roller 31 and is finally after passing additional guiding rollers wound up on a reel not shown in the drawing. This reel is rotated in well known manner by means of a pulley and belt arrangement combined with the driven sprocket 30.

For reflecting the light beam 12 through the compensating prism 17 after it has passed through film gate 13 and film 14 being in contact with the film guiding face 24 of the same, I preferably employ a specific deflecting prism, namely a Porro prism of the second type designated in the drawing with numeral 35; a prism of this type has three reflecting faces 36, 37 and 38 directing the light beam 12 as indicated in the drawings in broken lines. The two reflecting faces 36 and 37 of this prism deflect the light beam 12 so that the reflected light beam 39 is parallel to light beam 12, but directed in opposite direction. This reflected light beam 39 is then erected by the reflecting face 38; thus, after these three reflections the light beam 40 is located in a plane normal to the axis of rotation of shaft 18 and is directed normal to the path of light beam 12. This light beam 40 then passes through the compensating prism 17 and projection lens 41, as shown in Fig. 1.

The Porro prism 35 described above is supported by bracket 42 secured to the wall 10.

I wish to note that in a projector of the type described above it is of great importance to arrange the teeth of the sprocket 16 in such a manner that in the position of the compensating prism 17 shown in Fig. 1 the center of an image on film 14 is in the center of the aperture within film gate 13, i. e. that in this position the central ray of the light beam 12 passes through the center of a film image.

Although not specifically claimed, I wish to stress that the length of the aperture within the film gate 13 in direction of movement of the film has to be so great that at least two images on the film are simultaneously illuminated, i. e. projected through this aperture. This is necessary in order to avoid flicker along the edges of the projected images. This minimum size of the aperture in the film gate is of certain importance for the arrangement proposed by me, since it influences the minimum distance between the film gate and the prism driving sprocket.

In accordance with my present invention, the size of the compensating prism 17 is substantially smaller than the size of a prism which would correspond to the size of the frames on the film 14. In this way, it is possible to reduce the distance between sprocket 16 and film gate 13 considerably.

In order to compensate for the reduced size of prism 17, I provide also in accordance with my present invention between film gate 13 and Porro prism 35 a negative spherical lens 32 having a relatively great reducing power.

In the embodiment shown in Figs. 1 to 3, this negative spherical lens is calculated so as to reduce the film images projected by light beam 12 to such a degree that they correspond to the size of prism 17 if and when film 14 is in slightly shrunk condition.

The negative spherical lens 32 described above is adjustably mounted in the holding tube 33 secured by means of bracket 34 to wall 10, as clearly shown in Figs. 2 and 3.

In order to enable adjustment of lens 32, the same is mounted in a tubular lens mount 43 provided on its outer surface with a screw threading 44. This screw threaded tubular lens mount 43 fits into the tubular holding member 33 having a smooth inner surface.

In order to prevent turning of lens mount 43 in the holding member 33, a slot 45 is provided in the lens mount 43 and a pin 46 secured to the holding member 33 reaches into this slot.

The holding member 33 is also provided with a relatively wide slot 47 into which the annular screw threaded ring 48 fits. The screw threading on this ring 48 engages the screw threading 44 on the lens mount 43; thus, by turning ring 48, it is possible to slide lens mount 43 together with lens 32 in direction of arrow 49 and to adjust thereby the degree of reduction obtained by this lens.

As set forth above, lens 32 is preferably adjusted so as to reduce the size of the projected film images so that the size of the thus reduced projected film images corresponds to the reduced size of prism 17 if and when the film 14 is in slightly shrunk condition.

If a film is used which is in strongly shrunk condition, the degree of reduction has to be adjusted. As mentioned above, it is very difficult to compensate for the difference between a slightly and a strongly shrunk film by adjusting the position of lens 32 which has a great reducing power.

Therefore, I provide in accordance with my present invention in the same holding member 33 in which the negative lens 32 is arranged a slidably mounted positive spherical lens 50 having a relatively very small magnifying power, e. g. a magnifying power of about .5 diopters. This lens is slidably mounted in exactly the same way as lens 32 and therefore its adjusting mechanism will not be described in detail. It should only be noted that lens 50 can be moved in direction of arrow 49 by turning the adjusting ring 51.

In a projector of the above described type the negative lens 32 is adjusted only once, namely when it is mounted so as to compensate for the reduction of size of prism 17. The adjustable positive lens 50, on the contrary, is adjusted each time a film with different degree of shrinkage is used.

In Fig. 4 I have shown a lens arrangement in which the negative lens 52 is permanently adjusted so as to compensate for reduction of the size of prism 17 if and when the film 14 is in strongly shrunk condition. In such a case, instead of a positive lens 50, a negative spherical lens 53 is employed. This lens 53 has a very small reducing power, preferably of about .5 diopters, so as to be able to compensate for the difference between strongly and slightly shrunk film.

It will be understood that each of the elements described above, or two or more together, may also find a useful application in other types of cinematographic projectors differing from the types described above.

While I have illustrated and described the invention as embodied in a cinematographic projector provided with a Porro prism as light deflecting element, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A cinematographic projector comprising in combination a light source emitting a light beam; means for moving a film provided with a series of consecutive film frames with uniform speed normal through the path of said light beam, so that said light beam projects images of said film frames while said film is moving through its path; a rotatable rectifying prism arranged in the path of said light beam after the same has passed through said film and having a size which is substantially smaller than the size of a rectifying prism which corresponds to the size of said film frames on said film when the same is in slightly shrunk condition; a complete projection lens unit arranged in the path of said light beam after the same has passed through said rotatable rectifying prism; an optical reducing member not being an image forming part of said projection lens unit and arranged in the path of said light beam between the path of said film and said rotatable rectifying prism and having a relatively great reducing power calculated so as to be adapted to reduce the size of images of film frames on a film in slightly shrunk condition projected by said light beam so that the size of the reduced projected images corresponds to the size of said rotatable rectifying prism; and an optical magnifying member not being an image forming part of said projection lens unit and arranged in the path of said light beam between the path of said film and said rotatable rectifying prism slidably in direction of said path of said light beam and having a relatively small magnifying power.

2. A cinematographic projector comprising in combination a light source emitting a light beam; means for moving a film provided with a series of consecutive film frames with uniform speed normal through the path of said light beam, so that said light beam projects images of said film frames while said film is moving through its path; a rotatable rectifying prism arranged in the path of said light beam after the same has passed through said film and having a size which is substantially smaller than the size of a rectifying prism which corresponds to the size of said film frames on said film when the same is in unshrunk condition; a complete projection lens unit arranged in the path of said light beam after the same has passed through said rotatable rectifying prism; optical reducing means not being an image forming part of said projection lens unit and arranged in the path of said light beam between the path of said film and said rotatable rectifying prism and having a relatively great reducing power; and optical magnifying means not being an image forming part of said projection lens unit and arranged in the path of said light beam between the path of said film and said rotatable rectifying prism slidably in direction of said path of said light beam and having a relatively small magnifying power.

3. A cinematographic projector comprising in combination a light source emitting a light beam; means for moving a film provided with a series of consecutive film frames with uniform speed normal through the path of said light beam, so that said light beam projects images of said film frames while said film is moving through its path; a rotatable rectifying prism arranged in the path of said light beam after the same has passed through said film and having a size which is substantially smaller than the size of a rectifying prism which corresponds to the size of said film frames on said film; a complete projection lens unit arranged in the path of said light beam after the same has passed through said rotatable rectifying prism; first optical reducing means not being an image forming part of said projection lens unit and arranged in the path of said light beam between the path of said film and said rotatable rectifying prism and having a relatively great reducing power; and second optical reducing means not being an image forming part of said projection lens unit and arranged in the path of said light beam between the path of said film and said rotatable rectifying prism slidably in direction of said path and having a relatively small reducing power.

4. A cinematographic projector comprising in combination a light source emitting a light beam; means for moving a film provided with a series of consecutive film frames with uniform speed normal through the path of said light beam, so that said light beam projects images of said film frames while said film is moving through its path; a rotatable rectifying prism arranged in the path of said light beam after the same has passed through said film and having a size which is substantially smaller than the size of a rectifying prism which corresponds to the size of said film frames on said film when the same is in strongly shrunk condition; a complete projection lens unit arranged in the path of said light beam after the same has passed through said rotatable rectifying prism; first optical reducing means not being an image forming part of said projection lens unit and arranged in the path of said light beam between the path of said film and said rotatable rectifying prism and having a relatively great reducing power calculated so as to be adapted to reduce the size of images of film frames on a film in strongly shrunk condition projected by said light beam so that the size of the reduced projected images corresponds to the size of said rotatable rectifying prism; and second optical reducing means not being an image forming part of said projection lens unit and arranged in the path of said light beam between the path of said film and said rotatable rectifying prism slidably in direction of said path and having a relatively small reducing power.

5. A cinematographic projector comprising in combination a light source emitting a light beam; means for moving a film provided with a series of consecutive film frames with uniform speed normal through the path of said light beam, so that said light beam projects images of said film frames while said film is moving through its path; a rotatable rectifying prism arranged in the path of said light beam after the same has passed through said film and having a size which is substantially smaller than the size of a rectifying prism which corresponds to the size of said film frames on said film when the same is in slightly shrunk condition; a complete projection lens unit arranged in the path of said light beam after the same has passed through said rotatable rectifying prism; a negative spherical lens arranged in the path of said light beam between the path of said film and said rotatable rectifying prism and having a relatively great reducing power calculated so as to be adapted to reduce the size of images of film frames on a film in slightly shrunk condition projected by said light beam so that the size of the reduced projected images corresponds to the size of said rotatable rectifying prism; and a positive spherical lens not being an image forming part of said projection lens unit and arranged in the path of said light beam between the path of said film and said rotatable rectifying prism slidably in direction of said path of said light beam and having a relatively small magnifying power.

6. A cinematographic projector comprising in combination a light source emitting a light beam; means for moving a film provided with a series of consecutive film frames with uniform speed normal through the path of said light beam, so that said light beam projects images of said film frames while said film is moving through its path; a rotatable rectifying prism arranged in the path of said light beam after the same has passed through said film and having a size which is substantially smaller than the size of a rectifying prism which corresponds to the size of said film frames on said film when the same is in unshrunk condition; a complete projection lens unit arranged in the path of said light beam after the same has passed through said rotatable rectifying prism; a negative spherical lens not being an image forming part of said projection lens unit and arranged in the path of said light beam between the path of said film and said rotatable rectifying prism and having a relatively great reducing power; and a positive spherical lens not being an image forming part of said projection lens unit and arranged in the path of said light beam between the path of said film and said rotatable rectifying prism slidably in direction of said path of said light beam and having a relatively small magnifying power.

7. A cinematographic projector comprising in combination a light source emitting a light beam; means for moving a film provided with a series of consecutive film frames with uniform speed normal through the path of said light beam, so that said light beam projects images of said film frames while said film is moving through its path; a rotatable rectifying prism arranged in the path of said light beam after the same has passed through said film and having a size which is substantially smaller than the size of a rectifying prism which corresponds to the size of said film frames on said film when the same is in strongly shrunk condition; a complete projection lens unit arranged in the path of said light beam after the same has passed through said rotatable rectifying prism; a first negative spherical lens not being an image forming part of said projection lens unit and arranged in the path of said light beam between the path of said film and said rotatable rectifying prism and having a relatively great reducing power calculated so as to be adapted to reduce the size of images of film frames on a film in strongly shrunk condition projected by said light beam so that the size of the reduced projected images corresponds to the size of said rotatable rectifying prism; and a second negative spherical lens not being an image forming part of said projection lens unit and arranged in the path of said light beam between the path of said film and said rotatable rectifying prism slidably in direction of said path and having a relatively small reducing power.

8. A cinematographic projector comprising in combination a light source emitting a light beam; means for moving a film provided with a series of consecutive film frames with uniform speed normal through the path of said light beam, so that said light beam projects images of said film frames while said film is moving through its path; a rotatable rectifying prism arranged in the path of said light beam after the same has passed through said film and having a size which is substantially smaller than the size of a rectifying prism which corresponds to the size of said film frames on said film when the same is in slightly shrunk condition; a complete projection lens unit arranged in the path of said light beam after the same has passed through said rotatable rectifying prism; an optical reducing member not being an image forming part of said projection lens unit and arranged in the path of said light beam between the path of said film and said rotatable rectifying prism and having a relatively great reducing power calculated so as to be adapted to reduce the size of images of film frames on a film in slightly shrunk condition projected by said light beam so that the size of the reduced projected images corresponds to the size of said rotatable rectifying prism; and a positive spherical lens not being an image forming part of said projection lens unit and having a power of about .5 diopters arranged in the path of said light beam between the path of said film and said rotatable rectifying prism slidably in direction of said path of said light beam.

9. A cinematographic projector comprising in combination a light source emitting a light beam; means for moving a film provided with a series of consecutive film frames with uniform speed normal through the path of said light beam, so that said light beam projects images of said film frames while said film is moving through its path; a rotatable rectifying prism arranged in the path of said light beam after the same has passed through said film and having a size which is substantially smaller than the size of a rectifying prism which corresponds to the size of said film frames on said film when the same is in strongly shrunk condition; a complete projection lens unit arranged in the path of said light beam after the same has passed through said rotatable rectifying prism; first optical reducing means not being an image forming part of said projection lens unit and arranged in the path of said light beam between the path of said film and said rotatable rectifying prism and having a relatively great reducing power calculated so as to be adapted to reduce the size of images of film frames on a film in strongly shrunk condition projected by said light beam so that the size of the reduced projected images corresponds to the size of said rotatable rectifying prism; and second optical reducing means not being an image forming part of said projection lens unit and having a power of about .5 diopters arranged in the path of said light beam between the path of said film and said rotatable rectifying prism slidably in direction of said path of said light beam.

10. A cinematographic projector comprising in combination a light source emitting a light beam; means for moving a film provided with a series of consecutive film frames with uniform speed normal through the path of said light beam, so that said light beam projects images of said film frames while said film is moving through its path; a rotatable rectifying prism arranged in the path of said light beam after the same has passed through said film and having a size which is substantially smaller than the size of a rectifying prism which corresponds to the size of said film frames on said film when the same is in slightly shrunk condition; a complete projection lens unit arranged in the path of said light beam after the same has passed through said rotatable rectifying prism; a negative spherical lens not being an image forming part of said projection lens unit and arranged in the path of said light beam between the path of said film and said rotatable rectifying prism and having a relatively great reducing power calculated so as to be adapted to reduce the size of images of film frames on a film in slightly shrunk condition projected by said light beam so that the size of the reduced projected images corresponds to the size of said rotatable rectifying prism; and a positive spherical lens not being an image forming part of said projection lens unit and having a power of about .5 diopters arranged in the path of said light beam between the path of said film and said rotatable rectifying prism slidably in direction of said path of said light beam.

11. A cinematographic projector comprising in combination a light source emitting a light beam; means for moving a film provided with a series of consecutive film frames with uniform speed normal through the path of said light beam, so that said light beam projects images of said film frames while said film is moving through its path; a rotatable rectifying prism arranged in the path of said light beam after the same has passed through said film and having a size which is substantially smaller than the size of a rectifying prism which corresponds to the size of said film frames on said film when the same is in strongly shrunk condition; a complete projection lens unit arranged in the path of said light beam after the same has passed through said rotatable rectifying prism; a first negative spherical lens not being an image forming part of said projection lens unit and arranged in the path of said light beam between the path of said film and said rotatable rectifying prism and having a relatively great reducing power calculated so as to be adapted to reduce the size of images of film frames on a film in strongly shrunk condition projected by said light beam so that the size of the reduced projected images corresponds to the size of said rotatable rectifying prism; and a second negative spherical lens not being an image forming part of said projection lens unit and having a power of about .5 diopters arranged in the path of said light beam between the path of said film and said rotatable rectifying prism slidably in direction of said path of said light beam.

FRANZ F. EHRENHAFT.

REFERENCES CITED

The following references are of record in the file of this patent:

UNITED STATES PATENTS

| Number | Name | Date |
|---|---|---|
| 2,168,433 | Parvopassu | Aug. 8, 1939 |
| 2,247,295 | Heinisch | June 24, 1941 |

FOREIGN PATENTS

| Number | Country | Date |
|---|---|---|
| 134,534 | Germany | Nov. 26, 1901 |
| 728,012 | France | Apr. 5, 1932 |
| 527,956 | Great Britain | Oct. 18, 1940 |